(12) United States Patent
Fukushima et al.

(10) Patent No.: US 9,627,935 B2
(45) Date of Patent: Apr. 18, 2017

(54) MULTI-GAP ROTATING ELECTRIC MACHINE HAVING PHASE COILS FORMED OF SUBSTANTIALLY U-SHAPED ELECTRIC CONDUCTOR SEGMENTS

(71) Applicant: DENSO CORPORATION, Kariya, Aichi-pref. (JP)

(72) Inventors: Akira Fukushima, Kariya (JP); Shin Kusase, Obu (JP); Takeo Maekawa, Okazaki (JP); Keiji Kondou, Nagoya (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 14/173,397

(22) Filed: Feb. 5, 2014

(65) Prior Publication Data

US 2014/0232233 A1    Aug. 21, 2014

(30) Foreign Application Priority Data

Feb. 20, 2013  (JP) ................. 2013-031183

(51) Int. Cl.
| | |
|---|---|
| *H02K 16/00* | (2006.01) |
| *H02K 16/04* | (2006.01) |
| *H02K 3/28* | (2006.01) |
| *H02K 21/14* | (2006.01) |
| *H02K 21/22* | (2006.01) |
| *H02K 19/10* | (2006.01) |

(Continued)

(52) U.S. Cl.
CPC ............. *H02K 3/28* (2013.01); *H02K 3/12* (2013.01); *H02K 19/103* (2013.01); *H02K 21/14* (2013.01); *H02K 21/22* (2013.01); *H02K 1/16* (2013.01); *H02K 1/27* (2013.01); *H02K 16/025* (2013.01); *H02K 16/04* (2013.01)

(58) Field of Classification Search
CPC .. H02K 1/16; H02K 1/27; H02K 3/12; H02K 3/28; H02K 16/04; H02K 16/00; H02K 16/025
USPC ................. 310/198, 201, 210, 112, 114, 266
IPC ............................................. H02K 16/00,16/04
See application file for complete search history.

(56) References Cited

U.S. PATENT DOCUMENTS

| | | | | |
|---|---|---|---|---|
| 5,345,133 | A | * | 9/1994 | Satake .................... H02K 21/12 310/156.45 |
| 6,093,992 | A | * | 7/2000 | Akemakou ............ H02K 16/04 310/156.55 |

(Continued)

FOREIGN PATENT DOCUMENTS

| | | |
|---|---|---|
| JP | 2003-134751 A | 5/2003 |
| JP | 2012-080692 | 4/2012 |

*Primary Examiner* — Michael Andrews
*Assistant Examiner* — Rashad Johnson
(74) *Attorney, Agent, or Firm* — Nixon & Vanderhye P.C.

(57) ABSTRACT

A multi-gap rotating electric machine includes a rotor, a stator core and a stator coil. The stator core has inner and outer core parts respectively located radially inside and outside of the rotor and each having partially or fully closed slots. The stator coil is formed of electric conductor segments each having a first leg portion inserted in one of the slots of the inner core part, a second leg portion inserted in one of the slots of the outer core part, and a connecting portion connecting the first and second leg portions on one axial side of the rotor. The first and second leg portions respectively have radially inner and outer coil end parts formed on the opposite axial side to the connecting portion. Corresponding radially inner coil end parts are joined to each other, and corresponding radially outer coil end parts are joined to each other.

5 Claims, 10 Drawing Sheets

(51) Int. Cl.
*H02K 3/12* (2006.01)
*H02K 1/27* (2006.01)
*H02K 16/02* (2006.01)
*H02K 1/16* (2006.01)

(56) References Cited

U.S. PATENT DOCUMENTS

| | | | | |
|---|---|---|---|---|
| 7,791,245 B1* | 9/2010 | Hao | ................ | H02K 21/12 |
| | | | | 310/114 |
| 7,999,431 B2* | 8/2011 | Dooley | ................ | H02K 21/046 |
| | | | | 310/180 |
| 8,138,617 B2* | 3/2012 | Poo | ................ | H01L 21/78 |
| | | | | 257/665 |
| 9,106,121 B2* | 8/2015 | Kusase | ................ | H02K 16/04 |
| 9,231,457 B2* | 1/2016 | Abbasian | ................ | H02K 16/04 |
| 9,252,634 B2* | 2/2016 | Kondou | ................ | H02K 1/06 |
| RE45,912 E* | 3/2016 | Sakata | | |
| 2003/0201686 A1* | 10/2003 | Narita | ................ | H02K 16/04 |
| | | | | 310/211 |
| 2003/0201687 A1 | 10/2003 | Asai | | |
| 2007/0103027 A1* | 5/2007 | Jansen | ................ | F03D 9/002 |
| | | | | 310/266 |
| 2007/0108865 A1* | 5/2007 | Jansen | ................ | H02K 1/146 |
| | | | | 310/266 |
| 2010/0139999 A1* | 6/2010 | Park | ................ | H02K 1/278 |
| | | | | 180/65.51 |
| 2011/0285238 A1* | 11/2011 | Kusase | ................ | H02K 16/04 |
| | | | | 310/156.48 |
| 2011/0285243 A1 | 11/2011 | Taniguchi | | |
| 2012/0080977 A1* | 4/2012 | Kusase | ................ | H02K 7/14 |
| | | | | 310/216.001 |
| 2012/0181890 A1* | 7/2012 | Kleber | ................ | H02K 15/0081 |
| | | | | 310/201 |
| 2012/0274162 A1* | 11/2012 | Kleber | ................ | H02K 15/0081 |
| | | | | 310/71 |
| 2013/0099618 A1* | 4/2013 | Kusase | ................ | H02K 3/28 |
| | | | | 310/156.56 |
| 2013/0106231 A1* | 5/2013 | Chamberlin | ................ | H02K 3/12 |
| | | | | 310/201 |
| 2013/0113330 A1* | 5/2013 | Saito | ................ | H02K 3/28 |
| | | | | 310/207 |
| 2013/0207498 A1* | 8/2013 | Kusase | ................ | H02K 1/16 |
| | | | | 310/156.01 |
| 2013/0270955 A1* | 10/2013 | Lillington | ................ | H02K 1/2773 |
| | | | | 310/156.11 |
| 2014/0159532 A1* | 6/2014 | Kondou | ................ | H02K 1/276 |
| | | | | 310/156.53 |
| 2014/0159533 A1* | 6/2014 | Kondou | ................ | H02K 1/276 |
| | | | | 310/156.53 |
| 2014/0232233 A1* | 8/2014 | Fukushima | ................ | H02K 3/28 |
| | | | | 310/201 |
| 2015/0137655 A1* | 5/2015 | Maekawa | ................ | H02K 1/30 |
| | | | | 310/216.129 |
| 2015/0270754 A1* | 9/2015 | Kusase | ................ | H02K 3/12 |
| | | | | 310/54 |
| 2015/0340936 A1* | 11/2015 | Matsumoto | ................ | B60L 11/14 |
| | | | | 310/115 |
| 2016/0043619 A1* | 2/2016 | Maekawa | ................ | H02K 16/04 |
| | | | | 310/156.08 |
| 2016/0065010 A1* | 3/2016 | Kondou | ................ | H02K 1/18 |
| | | | | 310/91 |

* cited by examiner

CIRCUMFERENTIAL DIRECTION (IV-IV)

(V-V)

MULTI-GAP ROTATING ELECTRIC MACHINE HAVING PHASE COILS FORMED OF SUBSTANTIALLY U-SHAPED ELECTRIC CONDUCTOR SEGMENTS

CROSS-REFERENCE TO RELATED APPLICATION

This application is based on and claims priority from Japanese Patent Application No. 2013-31183 filed on Feb. 20, 2013, the content of which is hereby incorporated by reference in its entirety into this application.

BACKGROUND

1. Technical Field

The present invention relates generally to multi-gap rotating electric machines for use in, for example, motor vehicles. More particularly, the invention relates to a multi-gap rotating electric machine which is suitable for use as a high-performance and small-sized electric motor in a hybrid vehicle.

2. Description of Related Art

Japanese Unexamined Patent Application Publication No. 2012-80692, an English equivalent of which is US Patent Application Publication No. 2012/0080977 A1, discloses a multi-gap rotating electric machine.

The multi-gap rotating electric machine includes a rotor and a stator. The rotor has an annular rotor core connected to a rotating shaft. The stator includes a stator core and a stator coil. The stator core includes an outer core part, an inner core part and a side core part. The outer core part has an annular shape and is located radially outside of the rotor core with a radially outer magnetic gap formed between the outer core part and the rotor core. The outer core part has a plurality of slots that are formed in a radially inner surface of the outer core part and spaced from one another in the circumferential direction of the outer core part. The inner core part has an annular shape and is located radially inside of the rotor core with a radially inner magnetic gap formed between the inner core part and the rotor core. The inner core part has a plurality of slots that are formed in a radially outer surface of the inner core part and spaced from one another in the circumferential direction of the inner core part. The side core part radially extends to connect the outer and inner core parts. The side core part is located on one axial side of the rotor core with an axial magnetic gap formed between the side core part and the rotor core. The side core part has a plurality of slots each of which is formed in an axial end face of the side core part facing the rotor core so as to communicate with one corresponding pair of the slots of the outer and inner core parts. The stator coil is formed of a plurality of electric wires mounted on the stator core. Each of the electric wires has a plurality of outer in-slot portions, a plurality of inner in-slot portions and a plurality of intermediate in-slot portions. Each of the outer in-slot portions is received in a corresponding one of the slots of the outer core part of the stator core. Each of the inner in-slot portions is received in a corresponding one of the slots of the inner core part of the stator core. Each of the intermediate in-slot portions is received in a corresponding one of the slots of the side core part of the stator core.

With the above configuration, the rotor core and the stator core face each other through the three magnetic gaps formed therebetween, i.e., the radially outer magnetic gap, the radially inner magnetic gap and the axial magnetic gap. Consequently, compared to the case of a rotating electric machine which has only a radially outer magnetic gap and a radially inner magnetic gap formed between the rotor core and the stator core, it is possible to increase the amount of magnetic flux transferred between the rotor and the stator, thereby increasing the output torque of the rotating electric machine.

Moreover, according to the disclosure of the above patent document, in assembling the stator, the electric wires are first assembled together to form the stator coil which has the shape of a ring. Then, the stator coil is axially moved toward the stator core from the opposite side to the side core part of the stator core, until the outer, inner and intermediate in-slot portions of the electric wires forming the stator coil are respectively inserted in the slots of the outer, inner and side core parts of the stator core.

However, to assemble the stator in the above manner, it is necessary to configure the slots of the outer and inner core parts of the stator core as open slots. More specifically, to allow the outer, inner and intermediate in-slot portions of the electric wires to be respectively inserted into the slots of the outer, inner and side core parts of the stator core from the opposite side to the side core part of the stator core, it is necessary to configure the slots of the outer core part to be fully open at the radially inner surface of the outer core part and the slots of the inner core part to be fully open at the radially outer surface of the inner core part. Further, with the open slots of the outer and inner core parts of the stator core, to suppress torque ripple, it is necessary to set the numbers of the slots of the outer, inner and side core parts of the stator core to be twice or more larger than usual. Consequently, with the increased numbers of the slots, the manufacture of the stator is complicated, thereby increasing the manufacturing cost.

SUMMARY

According to an exemplary embodiment, a multi-gap rotating electric machine is provided which includes a rotor, a stator core and a multi-phase stator coil. The rotor has an annular shape and is connected to a rotating shaft. The stator core has, at least, an inner core part and an outer core part. The inner core part has an annular shape and is located radially inside of the rotor with a radially inner magnetic gap formed between the inner core part and the rotor. The inner core part has a plurality of slots formed at a constant pitch in the circumferential direction of the inner core part. The outer core part has an annular shape and is located radially outside of the rotor with a radially outer magnetic gap formed between the outer core part and the rotor. The outer core part has a plurality of slots formed at a constant pitch in the circumferential direction of the outer core part. The stator coil includes a plurality of phase coils. Each of the phase coils is formed of a plurality of electric conductor segments mounted on the stator core. Each of the slots of the inner core part of the stator core is formed so as to be at least partially closed at a radially outer periphery of the inner core part. Each of the slots of the outer core part of the stator core is formed so as to be at least partially closed at a radially inner periphery of the outer core part. Each of the electric conductor segments forming the phase coils of the stator coil is substantially U-shaped to have a first leg portion inserted in a corresponding one of the slots of the inner core part of the stator core, a second leg portion inserted in a corresponding one of the slots of the outer core part of the stator core, and a connecting portion that connects the first and second leg portions on one axial side of the rotor. The first leg portion has a distal end part that protrudes from the corresponding slot of the inner core part of the stator core on the opposite axial side to the connecting portion of the electric conductor segment. The distal end part of the first leg portions is bent to extend along the circumferential direction of the inner core part and thereby forms a radially inner coil end part of the electric conductor segment. The second leg portion has a distal end part that protrudes from the corresponding slot of the outer core part of the stator core on the opposite axial side to the connecting portion of the electric conductor segment. The distal end part of the second leg portion is bent to extend along the circumferential direction of the outer core part and thereby forms a radially outer coil end part of the electric conductor segment. Each corresponding pair of the radially inner coil end parts of the electric conductor segments are joined to each other. Each corresponding pair of the radially outer coil end parts of the electric conductor segments are joined to each other.

With the above configuration, it is possible to form the phase coils of the stator coil by: (1) inserting the first and second leg portions of the electric conductor segments into the corresponding slots of the inner and outer core parts of the stator core from the one axial side of the rotor; (2) bending the distal end parts of the first and second leg portions of the electric conductor segments to form the radially inner coil end parts and radially outer coil end parts of the electric conductor segments; and (3) joining each corresponding pair of the radially inner coil end parts and each corresponding pair of the radially outer coil end parts. Further, with the above formation of the stator coil, it is possible to insert the first and second leg portions of the electric conductor segments into the corresponding slots of the inner and outer core parts of the stator core without passing the connecting portions of the electric conductor segments through the slots of the inner and outer core parts. Consequently, without the necessity of passing the connecting portions of the electric conductor segments through the slots of the inner and outer core parts of the stator core, it becomes possible to form each of the slots of the inner and outer core parts as a partially or fully closed slot. As a result, with the partially or fully closed formation of the slots of the inner and outer core parts, it becomes no longer necessary to set the numbers of the slots of the inner and outer core parts to be twice or more larger than usual for the purpose of suppressing torque ripple of the rotating electric machine. In other words, it becomes possible to effectively suppress torque ripple of the rotating electric machine with the numbers of the slots of the inner and outer core parts set to suitable values.

Moreover, with the above configuration, all the radially inner coil end parts and radially outer coil end parts of the electric conductor segments are formed on the same axial side of the stator core, thereby facilitating the process of joining the corresponding pairs of the radially inner coil end parts and radially outer coil end parts of the electric conductor segments.

In a further implementation, for each of the substantially U-shaped electric conductor segments, the distal end part of the first leg portion of the electric conductor segment is bent toward one circumferential side to form the radially inner coil end part, and the distal end part of the second leg portion of the electric conductor segment is bent toward the other circumferential side to form the radially outer coil end part.

Preferably, the stator core further has a side core part that is located on the one axial side of the rotor with an axial magnetic gap formed between the side core part and the rotor.

Further, preferably, the side core part of the stator core is mechanically connected with both the inner and outer core parts of the stator core. The side core part has a plurality of slots each of which axially penetrates the side core part and radially extends to communicate with one corresponding pair of the slots of the inner and outer core parts. At least part of the substantially U-shaped electric conductor segments have their respective connecting portions received in corresponding ones of the slots of the side core part.

Preferably, the stator coil is comprised of first and second coil units each of which consists of a plurality of phase coils. The first and second coil units are connected in parallel with each other. Each of the phase coils of the first and second coil units is formed by connecting a predetermined number of the substantially U-shaped electric conductor segments. For each of the phase coils, of the first and second coil units, the first leg portions of the electric conductor segments forming the phase coil are arranged in the corresponding slots of the inner core part of the stator core in a radially shifted manner; the corresponding slots of the inner core part are circumferentially apart from one another by a predetermined number of the slots of the inner core part. The second leg portions of the electric conductor segments forming the phase coil are arranged in the corresponding slots of the outer core part of the stator core in a radially shifted manner; the corresponding slots of the outer core part are circumferentially apart from one another by a predetermined number of the slots of the outer core part.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
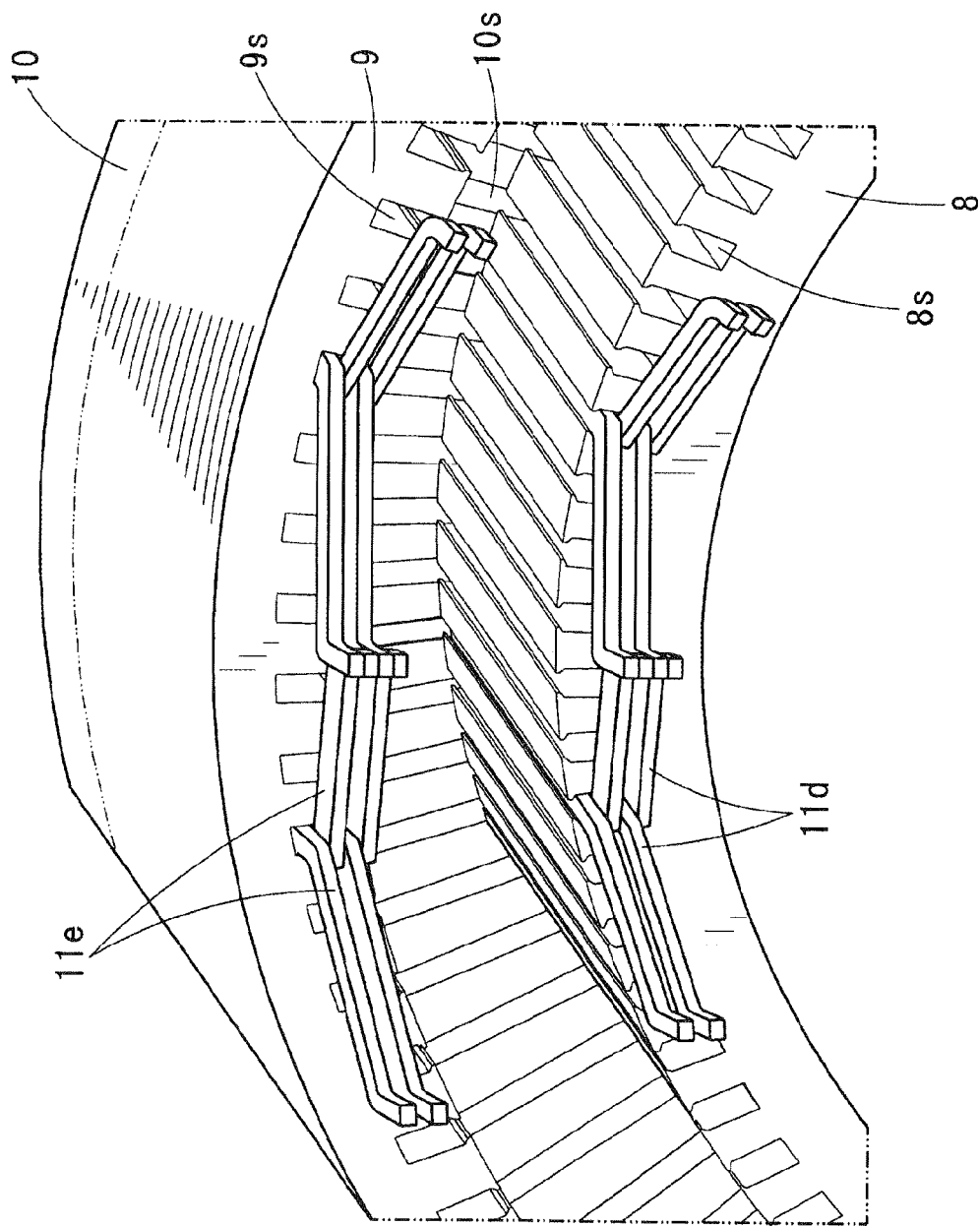
FIG. 1 is a schematic perspective view illustrating the configuration of a stator core and the electric connection between substantially U-shaped electric conductor segments mounted on the stator core in a multi-gap rotating electric machine according to a first embodiment, the electric conductor segments together forming a stator coil of the machine.

Exemplary embodiments will be described hereinafter with reference to FIGS. 1-11. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

Figure 6:
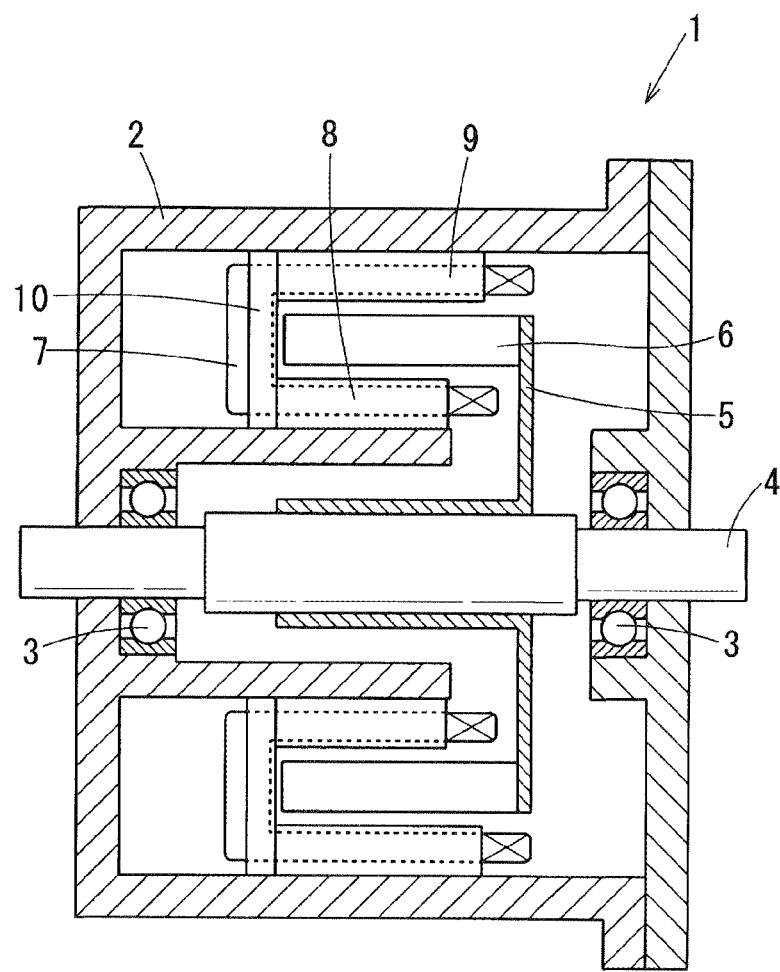
FIG. 6 is a schematic cross-sectional view of the multi-gap rotating electric machine according to the first embodiment.

FIG. 6 shows the overall configuration of a multi-gap rotating electric machine according to a first embodiment.

In this embodiment, the multi-gap rotating electric machine is configured as a traction motor 1 to be arranged between an engine and a transmission in a hybrid vehicle.

As shown in FIG. 6, the motor 1 includes: a motor housing 2; a rotating shaft 4 that is rotatably supported by the motor housing 2 via a pair of bearings 3; an annular rotor 6 that is supported by the rotating shaft 4 via a rotor disc 5; a stator core that is fixed to the motor housing 2 and will be described in detail later; and a three-phase stator coil 7 mounted on the stator core.

The rotating shaft 4 is configured to be coupled to a crankshaft (not shown) of the engine either directly or via a clutch (not shown).

The rotor disc 5 is made, for example, of a nonmagnetic stainless steel. The rotor disc 5 is fitted on the outer periphery of the rotating shaft 4 so as to support the rotor 6 coaxially with the rotating shaft 4.

The rotor 6 includes a rotor core that is formed by laminating a plurality of magnetic steel sheets in the axial direction of the rotor 6; each of the magnetic steel sheets is blanked into an annular shape by, for example, a press. Moreover, the rotor 6 is configured as either a salient-pole rotor having a salient-pole structure formed in the rotor core or a permanent magnet rotor having a plurality of permanent magnets embedded in the rotor core.

The stator core includes an inner core part 8, an outer core part 9 and a side core part 10. The inner core part 8 has an annular shape and is located radially inside of the rotor 6 with a radially inner magnetic gap formed between the inner core part 8 and the rotor 6. The outer core part 9 also has an annular shape and is located radially outside of the rotor 6 with a radially outer magnetic gap formed between the outer core part 9 and the rotor 6. The side core part 10 has such an annular shape as to radially extend to connect the inner and outer core parts 8 and 9. The side core part 10 is located on one axial side (i.e., the left side in FIG. 6) of the rotor 6 with an axial magnetic gap formed between the side core part 10 and the rotor 6.

Each of the inner, outer and side core parts 8, 9 and 10 is formed by laminating a plurality of magnetic steel sheets in the axial direction of the core part; each of the magnetic steel sheets is blanked into the annular shape of the core part by, for example, a press. Moreover, both the inner and outer core parts 8 and 9 are mechanically connected with the side core part 10 on the one axial side of the rotor 6 and disposed coaxially with the rotor 6.

Referring now to FIGS. 1-4, the inner core part 8 of the stator core has a plurality of slots 8s that are formed in a radially outer surface of the inner core part 8 at a constant pitch in the circumferential direction of the inner core part 8. Further, each of the slots 8s is formed so as to penetrate the inner core part 8 in the axial direction thereof (i.e., the left-right direction in FIGS. 4-6). Furthermore, in the present embodiment, each of the slots 8s is configured as a semi-closed slot. That is, each of the slots 8s is partially closed at the radially outer surface of the inner core part 8 so that the circumferential width Sa of an opening of the slot 8s formed at the radially outer surface of the inner core part 8 is less than the circumferential width Sb of the slot 8s at the other parts of the slot 8s.

More specifically, in the present embodiment, the inner core part 8 of the stator core also has a plurality of teeth 8a each of which is formed between one circumferentially-adjacent pair of the slots 8s of the inner core part 8. Further, each of the teeth 8a has a pair of collar portions 8b formed at its distal end so as to respectively protrude toward opposite sides in the circumferential direction of the inner core part 8. The circumferential distance between each facing pair of the collar portions 8b of the teeth 8a represents the circumferential width Sa of the openings of the slots 8s.

Similarly, the outer core part 9 of the stator core has a plurality of slots 9s that are formed in a radially inner surface of the outer core part 9 at a constant pitch in the circumferential direction of the outer core part 9. Further, each of the slots 9s is formed so as to penetrate the outer core part 9 in the axial direction thereof (i.e., the left-right direction in FIGS. 4-6). Furthermore, in the present embodiment, each of the slots 9s is configured as a semi-closed slot. That is, each of the slots 9s is partially closed at the radially inner surface of the outer core part 9 so that the circumferential width Sa of an opening of the slot 9s formed at the radially inner surface of the outer core part 9 is less than the circumferential width Sb of the slot 9s at the other parts of the slot 9s.

More specifically, in the present embodiment, the outer core part 9 of the stator core also has a plurality of teeth 9a each of which is formed between one circumferentially-adjacent pair of the slots 9s of the outer core part 9. Further, each of the teeth 9a has a pair of collar portions 9b formed at its distal end so as to respectively protrude toward opposite sides in the circumferential direction of the outer core part 9. The circumferential distance between each facing pair of the collar portions 9b of the teeth 9a represents the circumferential width Sa of the openings of the slots 9s.

In addition, in the present embodiment, the circumferential width Sb of the slots 9s of the outer core part 9 is set to be equal to that of the slots 8s of the inner core part 8; the circumferential width Sa of the openings of the slots 9s is set to be equal to that of the openings of the slots 8s.

Moreover, in the present embodiment, the number of the slots 8s formed in the inner core part 8 is set to be equal to the number of the slots 9s formed in the outer core part 9. More specifically, in the inner core part 8, there are formed two slots 8s per magnetic pole of the rotor 6 that has a total of sixteen magnetic poles and per phase of the three-phase stator coil 7. Accordingly, the total number of the slots 8s formed in the inner core part 8 is equal to 96 (i.e., 2×16×3). Similarly, in the outer core part 9, there are formed two slots 9s per magnetic pole of the rotor 6 and per phase of the three-phase stator coil 7. Accordingly, the total number of the slots 9s formed in the outer core part 9 is also equal to 96.

Figure 3:
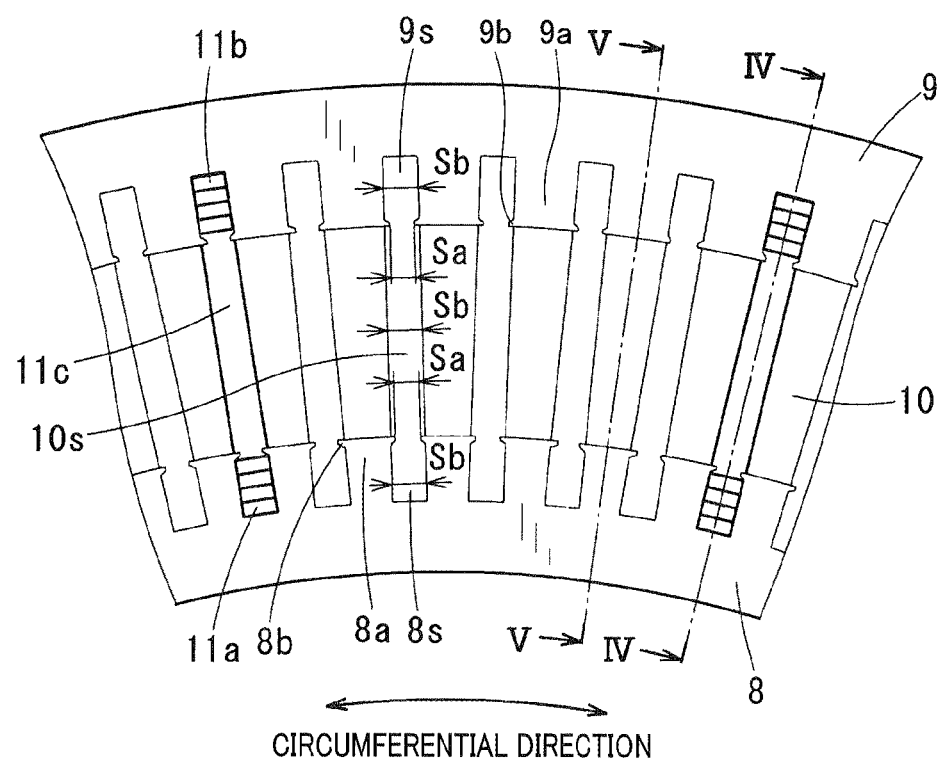
FIG. 3 is a schematic axial view of part of the stator core from the opposite side to a side core part of the stator core.

Furthermore, in the present embodiment, as shown in FIG. 3, each of the slots 8s of the inner core part 8 is formed at the same angular position as a corresponding one of the slots 9s of the outer core part 9. Consequently, each of the slots 8s of the inner core part 8 is radially aligned with the corresponding one of the slots 9s of the outer core part 9 with the opening of the slot 8s radially facing the opening of the corresponding slot 9s.

On the other hand, the side core part 10 of the stator core has a plurality (e.g., 96 in the present embodiment) of slots 10s formed at a constant pitch in the circumferential direction of the side core part 10. Further, each of the slots 10s is formed so as to penetrate the side core part 10 in the axial direction thereof (i.e., the left-right direction in FIGS. 4-6). Furthermore, each of the slots 10s radially extends so as to communicate with one radially-aligned pair of the slots 8s and 9s of the inner and outer core parts 8 and 9. In addition, each of the slots 10s of the side core part 10 has a circumferential width Sb equal to the circumferential widths Sb of the slots 8s and 9s of the inner and outer core parts 8 and 9.

The stator coil 7 is comprised of three phase coils (e.g., U-phase, V-phase and W-phase coils) that are star-connected to each other. Further, each of the phase coils is formed by connecting a plurality of substantially U-shaped electric conductor segments 11 mounted on the stator core.

Figure 2:
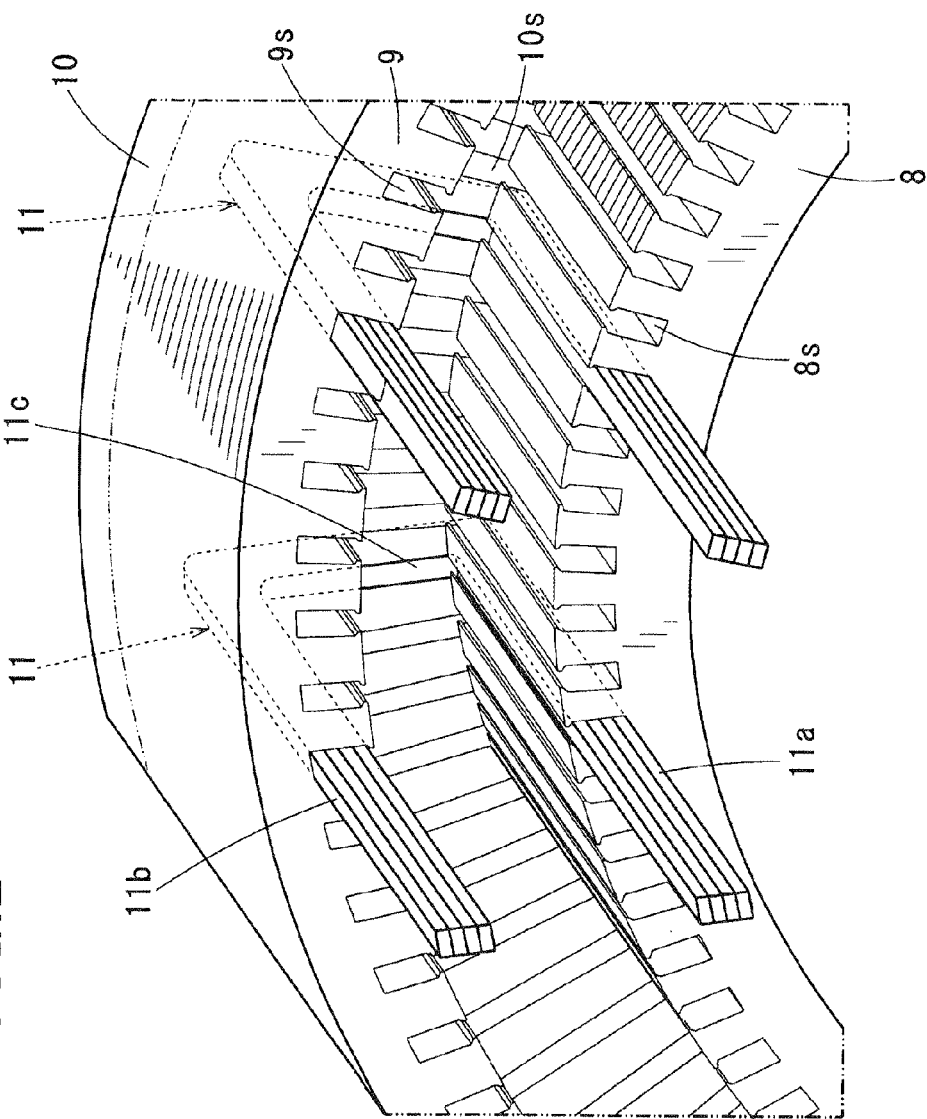
FIG. 2 is a schematic perspective view illustrating the mounting of the electric conductor segments to the stator core.
Figure 4:
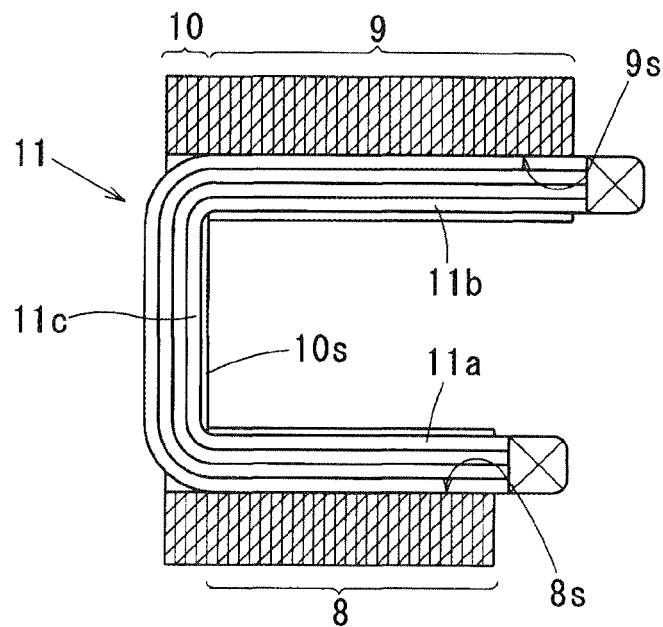
FIG. 4 is a schematic cross-sectional view taken along the line IV-IV in FIG. 3.

Specifically, each of the substantially U-shaped electric conductor segments 11 is formed by bending a straight electric conductor segment that has a rectangular cross-sectional shape. Further, as shown in FIGS. 2-4, each of the substantially U-shaped electric conductor segments 11 has a first leg portion 11a inserted in a corresponding one of the slots 8s of the inner core part 8 of the stator core, a second leg portion 11b inserted in a corresponding one of the slots 9s of the outer core part 9 of the stator core, and a connecting portion 11c that connects ends of the first and second leg portions 11a and 11b on the same side (i.e., on the side core part 10 side). In addition, for each of the substantially U-shaped electric conductor segments 11, the first leg portion 11a of the electric conductor segment 11 has a length greater than the axial length (or the lamination thickness) of the inner core part 8 of the stator core, and the second leg portion 11b of the electric conductor segment 11 has a length greater than the axial length (or the lamination thickness) of the outer core part 9 of the stator core.

Moreover, in the present embodiment, the substantially U-shaped electric conductor segments 11 are mounted to the stator core from the side core part 10 side such that: the first and second leg portions 11a and 11b of the electric conductor segments 11 are passed through the corresponding slots 10s of the side core part 10 and respectively inserted into the corresponding slots 8s and 9s of the inner and outer core parts 8 and 9; and the connecting portions 11c of the electric conductor segments 11 are respectively inserted into the corresponding slots 10s of the side core part 10.

Further, in the present embodiment, as shown in FIGS. 2-4, every four of the substantially U-shaped electric conductor segments 11 are superposed (or stacked) in their thickness direction and together inserted in the same slots 8s, 9s and 10s of the inner, outer and side core parts 8, 9 and 10 of the stator core.

Figure 5:
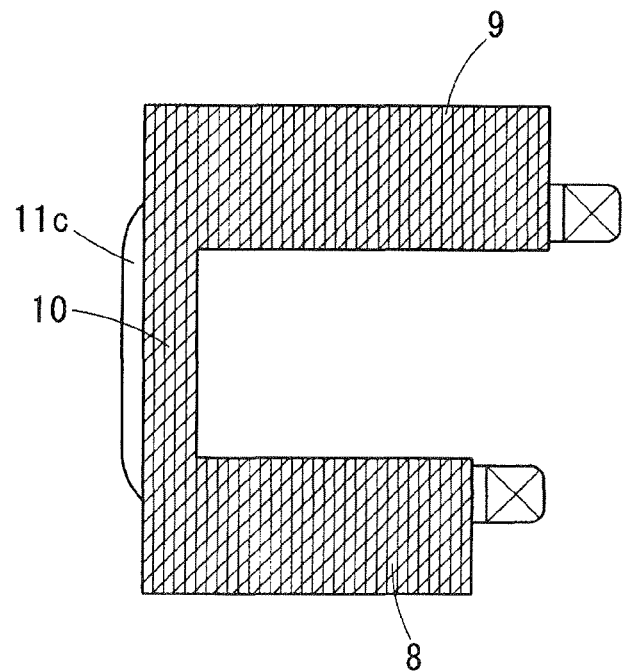
FIG. 5 is a schematic cross-sectional view taken along the line V-V in FIG. 3.

Consequently, in each of the slots 8s of the inner core part 8, there are received four of the first leg portions 11a of the electric conductor segments 11 in radial alignment with each other. Similarly, in each of the slots 9s of the outer core part 9, there are received four of the second leg portions 11b of the electric conductor segments 11 in radial alignment with each other. On the other hand, in each of the slots 10s of the side core part 10, there may or may not be received four of the connecting portions 11c of the electric conductor segments 11 in axial alignment with each other depending on the axial length (or the lamination thickness) of the side core part 9. For example, as shown in FIGS. 4 and 5, in the case of the axial length of the side core part 10 being not sufficiently large, in each of the slots 10s of the side core part 10, there are received only three of the four superposed connecting portions 11c of the electric conductor segments 11, with the remaining one connecting portion 11c protruding outside (i.e., leftward in the figures) of the slot 10s. However, though not shown in the drawings, by increasing the axial length of the side core part 10, it is also possible to allow each of the slots 10s of the side core part 10 to receive all the four superposed connecting portions 11c of the electric conductor segments 11 therein.

After insertion of the first and second leg portions 11a and 11b and connecting portions 11c of the substantially U-shaped electric conductor segments 11 into the corresponding slots 8s, 9s and 10s of the inner, outer and side core parts 8, 9 and 10 of the stator core, as shown in FIG. 2, distal end parts of the first and second leg portions 11a and 11b of the electric conductor segments 11 axially protrude from the corresponding slots 8s and 9s of the inner and outer core parts 8 and 9 on the opposite side to the side core part 10. Then, as shown in FIG. 1, for half of the substantially U-shaped electric conductor segments 11, each of the distal end parts of the first leg portions 11a of the electric conductor segments 11 is bent toward one circumferential side with respect to the inner core part 8, forming a radially inner coil end part 11d; each of the distal end parts of the second leg portions 11b of the electric conductor segments 11 is bent toward the other circumferential side with respect to the outer core part 9, forming a radially outer coil end part 11e. In contrast, for the other half of the substantially U-shaped electric conductor segments 11, each of the distal end parts of the first leg portions 11a of the electric conductor segments 11 is bent toward the other circumferential side with respect to the inner core part 8, forming a radially inner coil end part 11d; each of the distal end parts of the second leg portions 11b of the electric conductor segments 11 is bent toward the one circumferential side with respect to the outer core part 9, forming a radially outer coil end part 11e. Further, in the present embodiment, for each of the slots 8s of the inner core part 8, the radially inner coil end parts 11d of the four electric conductor segments 11 inserted in the slot 8s are formed so as to extend alternately toward opposite circumferential sides from the slot 8s. Similarly, for each of the slots 9s of the outer core part 9, the radially outer coil end parts 11e of the four electric conductor segments 11 inserted in the slot 9s are formed so as to extend alternately toward opposite circumferential sides from the slot 9s.

Furthermore, in the present embodiment, the radially inner coil end parts 11d of each corresponding pair of the electric conductor segments 11 are joined, for example, by welding; for each corresponding pair of the electric conductor segments 11, the first leg portions 11a of the electric conductor segments 11 of the pair are respectively inserted in two slots 8s of the inner core part 8 which are circumferentially apart from each other by a predetermined number (e.g., six) of slots 8s. Similarly, the radially outer coil end parts 11e of each corresponding pair of the electric conductor segments 11 are joined, for example, by welding; for each corresponding pair of the electric conductor segments 11, the second leg portions 11b of the electric conductor segments 11 of the pair are respectively inserted in two slots 9s of the outer core part 9 which are circumferentially apart from each other by a predetermined number (e.g., six) of slots 9s.

More specifically, the first leg portions 11a of the electric conductor segments 11 are arranged in four layers in each of the slots 8s of the inner core part 8. Similarly, the second leg portions 11b of the electric conductor segments 11 are arranged in four layers in each of the slots 9s of the outer core part 9.

Hereinafter, for the sake of convenience of explanation, the four layers in each of the slots 8s of the inner core part 8 will be sequentially referred to as first, second, third and fourth layers in the depth direction of the slot 8s from the opening (or the radially outer end) to the bottom (or the radially inner end) of the slot 8s. Similarly, the four layers in each of the slots 9s of the outer core part 9 will be sequentially referred to as first, second, third and fourth layers in the depth direction of the slot 9s from the opening (or the radially inner end) to the bottom (or the radially outer end) of the slot 9s.

As shown in FIG. 1, for each of the slots 8s of the inner core part 8, among the four radially inner coil end parts 11d of the electric conductor segments 11 which protrude from the slot 8s, the two radially inner coil end parts 11d which respectively protrude from the first and third layers of the slot 8s are bent toward the one circumferential side (i.e., the left side in FIG. 1), while the other two radially inner coil end parts 11d which respectively protrude from the second and fourth layers of the slot 8s are bent toward the other circumferential side (i.e., the right side in FIG. 1) with respect to the inner core part 8. That is, the four radially inner coil end parts 11d respectively protruding from the first to the fourth layers of the slot 8s are bent alternately toward opposite circumferential sides.

Further, for every two of the slots 8s of the inner core part 8 which are circumferentially apart from each other by six slots 8s, the radially inner coil end part 11d that protrudes from the first layer of one of the two slots 8s and the radially inner coil end part 11d that protrudes from the second layer of the other slot 8s are opposed to have their respective distal ends overlapping each other and joined together at the overlapping distal ends thereof. Moreover, the radially inner coil end part 11d that protrudes from the third layer of the one slot 8s and the radially inner coil end part 11d that protrudes from the fourth layer of the other slot 8s are opposed to have their respective distal ends overlapping each other and joined together at the overlapping distal ends thereof.

On the other hand, for each of the slots 9s of the outer core part 9, among the four radially outer coil end parts 11e of the electric conductor segments 11 which protrude from the slot 9s, the two radially outer coil end parts 11e which respectively protrude from the first and third layers of the slot 9s are bent toward the other circumferential side (i.e., the right side in FIG. 1), while the other two radially outer coil end parts 11e which respectively protrude from the second and fourth layers of the slot 9s are bent toward the one circumferential side (i.e., the left side in FIG. 1) with respect to the outer core part 9. That is, the four radially outer coil end parts 11e respectively protruding from the first to the fourth layers of the slot 9s are bent alternately toward opposite circumferential sides.

Further, for every two of the slots 9s of the outer core part 9 which are circumferentially apart from each other by six slots 9s, the radially outer coil end part 11e that protrudes from the second layer of one of the two slots 9s and the radially outer coil end part 11e that protrudes from the first layer of the other slot 9s are opposed to have their respective distal ends overlapping each other and joined together at the overlapping distal ends thereof. Moreover, the radially outer coil end part 11e that protrudes from the fourth layer of the one slot 9s and the radially outer coil end part 11e that protrudes from the third layer of the other slot 9s are opposed to have their respective distal ends overlapping each other and joined together at the overlapping distal ends thereof.

The above-described motor 1 according to the present embodiment has the following advantages.

In the present embodiment, the motor 1 includes the annular rotor 6, the stator core and the three-phase stator coil 7. The rotor 6 is connected to the rotating shaft 4 via the rotor disc 5. The stator core includes the inner core part 8 and the outer core part 9. The inner core part 8 has the annular shape and is located radially inside of the rotor 6 with the radially inner magnetic gap formed between the inner core part 8 and the rotor 6. The inner core part 8 has the slots formed 8s at the constant pitch in the circumferential direction of the inner core part 8. The outer core part 9 has the annular shape and is located radially outside of the rotor 6 with the radially outer magnetic gap formed between the outer core part 9 and the rotor 6. The outer core part 9 has the slots 9s formed at the constant pitch in the circumferential direction of the outer core part 9. The stator coil 7 includes the phase coils, each of which is formed of the electric conductor segments 11 mounted on the stator core. Further, in the present embodiment, each of the slots 8s and 9s of the inner and outer core parts 8 and 9 of the stator core is formed as a semi-closed slot. That is, each of the slots 8s is partially closed at the radially outer periphery of the inner core part 8, and each of the slots 9s is partially closed at the radially inner periphery of the outer core part 9. Each of the electric conductor segments 11 forming the phase coils of the stator coil 7 is substantially U-shaped to have the first leg portion 11a inserted in the corresponding slot 8s of the inner core part 8 of the stator core, the second leg portion 11b inserted in the corresponding slot 9s of the outer core part 9 of the stator core, and the connecting portion 11c that connects the first and second leg portions 11a and 11b on the one axial side (i.e., the left side in FIGS. 4-6) of the rotor 6. The first leg portion 11a has its distal end part protruding from the corresponding slot 8s of the inner core part 8 of the stator core on the opposite axial side to the connecting portion 11c of the electric conductor segment 11. The distal end part of the first leg portions 11a is bent to extend along the circumferential direction of the inner core part 8, forming the radially inner coil end part 11d of the electric conductor segment 11. The second leg portion 11b has its distal end part protruding from the corresponding slot 9s of the outer core part 9 of the stator core on the opposite axial side to the connecting portion 11c of the electric conductor segment 11. The distal end part of the second leg portion 11b is bent to extend along the circumferential direction of the outer core part 9, forming the radially outer coil end part 11e of the electric conductor segment 11. Each corresponding pair of the radially inner coil end parts 11d of the electric conductor segments 11 are joined to each other. Each corresponding pair of the radially outer coil end parts 11e of the electric conductor segments 11 are joined to each other.

With the above configuration, it is possible to form the phase coils of the stator coil 7 by: (1) inserting the first and second leg portions 11a and 11b of the electric conductor segments 11 into the corresponding slots 8s and 9s of the inner and outer core parts 8 and 9 of the stator core from the one axial side of the rotor 6 (or the side core part 10 side); (2) bending the distal end parts of the first and second leg portions 11a and 11b of the electric conductor segments 11 to form the radially inner coil end parts 11d and radially outer coil end parts 11e of the electric conductor segments 11; and (3) joining each corresponding pair of the radially inner coil end parts 11d and each corresponding pair of the radially outer coil end parts 11e. Further, with the above formation of the stator coil 7, it is possible to insert the first and second leg portions 11a and 11b of the electric conductor segments 11 into the corresponding slots 8s and 9s of the inner and outer core parts 8 and 9 of the stator core without passing the connecting portions 11c of the electric conductor segments 11 through the slots 8s and 9s of the inner and outer core parts 8 and 9. Consequently, without the necessity of passing the connecting portions 11c of the electric conductor segments 11 through the slots 8s and 9s of the inner and outer core parts 8 and 9, it becomes possible to form each of the slots 8s and 9s as a semi-closed slot. As a result, with the semi-closed formation of the slots 8s and 9s of the inner and outer core parts 8 and 9, it becomes no longer necessary to set the numbers of the slots 8s and 9s to be twice or more larger than usual for the purpose of suppressing torque ripple of the motor 1. In other words, it becomes possible to effectively suppress torque ripple of the motor 1 with the numbers of the slots 8s and 9s set to suitable values. Here, the suitable values may be such that the numbers of the slots 8s and 9s per magnetic pole of the rotor 6 and per phase of the stator coil 7 are equal to 2 or 3 (e.g., 2 in the present embodiment). In addition, if the numbers of the slots 8s and 9s per magnetic pole of the rotor 6 and per phase of the stator coil 7 are set to 1, the total numbers of the slots 8s and 9s formed in the inner and outer core parts 8 and 9 would be too small to effectively suppress torque ripple of the motor 1. In contrast, if the numbers of the slots 8s and 9s per magnetic pole of the rotor 6 and per phase of the stator coil 7 are set to 4 or more, the total numbers of the slots 8s and 9s formed in the inner and outer core parts 8 and 9 would be too large, thus making it difficult to form the stator coil 7 on the stator core.

Moreover, with the above configuration, all the radially inner coil end parts 11d and radially outer coil end parts 11e of the electric conductor segments 11 are formed on the same axial side of the stator core (i.e., the opposite side to the side core part 10), thereby facilitating the process of joining the corresponding pairs of the radially inner coil end parts 11d and radially outer coil end parts 11e of the electric conductor segments 11.

In the present embodiment, the stator core further has the side core part 10 that is located on the one axial side (i.e., the left side in FIGS. 4-6) of the rotor 6 with the axial magnetic gap formed between the side core part 10 and the rotor 6.

Consequently, the stator core and the rotor 6 face each other through the three magnetic gaps, i.e., the radially inner magnetic gap formed between the inner core part 8 and the rotor 6, the radially outer magnetic gap formed between the outer core part 9 and the rotor 6 and the axial magnetic gap formed between the side core part 10 and the rotor 6. As a result, compared to the case of the stator core having no side core part 10, it is possible to increase the amount of magnetic flux transferred between the stator and the rotor 6, thereby increasing the output torque of the motor 1.

Further, in the present embodiment, the side core part 10 of the stator core is mechanically connected with both the inner and outer core parts 8 and 9 of the stator core, thereby imparting a one-piece structure to the stator core.

With the one-piece structure, it is possible to secure high concentricity of the inner core part 8 and the outer core part 9. Moreover, it is unnecessary to arrange an additional connecting member for connecting the inner and outer core parts 8 and 9. Consequently, it is possible to minimize the overall axial length of the motor 1.

Furthermore, in the present embodiment, the side core part 10 has the slots 10s each of which axially penetrates the side core part 10 and radially extends to communicate with one corresponding pair of the slots 8s and 9s of the inner and outer core parts 8 and 9. At least part (e.g., three out of four in FIG. 4) of the substantially U-shaped electric conductor segments 11 have their respective connecting portions 11c received in the corresponding slots 10s of the side core part 10.

With the above configuration, it is possible to insert the first and second leg portions 11a and 11b of each of the electric conductor segments 11 respectively into the corresponding slots 8s and 9s of the inner and outer core parts 8 and 9 at the same time. Moreover, by receiving the connecting portions 11c of the at least part of the electric conductor segments 11 in the corresponding slots 10s of the side core part 10, it is possible to reduce the overall axial length of the motor 1.

Second Embodiment

This embodiment illustrates a multi-gap rotating electric machine which has a similar configuration to the multi-gap rotating electric machine (i.e., the motor 1) according to the first embodiment; accordingly, only the differences therebetween will be described hereinafter.

In the first embodiment, the side core part 10 of the stator core has the slots 10s formed therein, so that part of the electric conductor segments 11 have their respective connecting portions 11c received in the corresponding slots 10s of the side core part 10 (see FIGS. 4-5).

Figure 7:
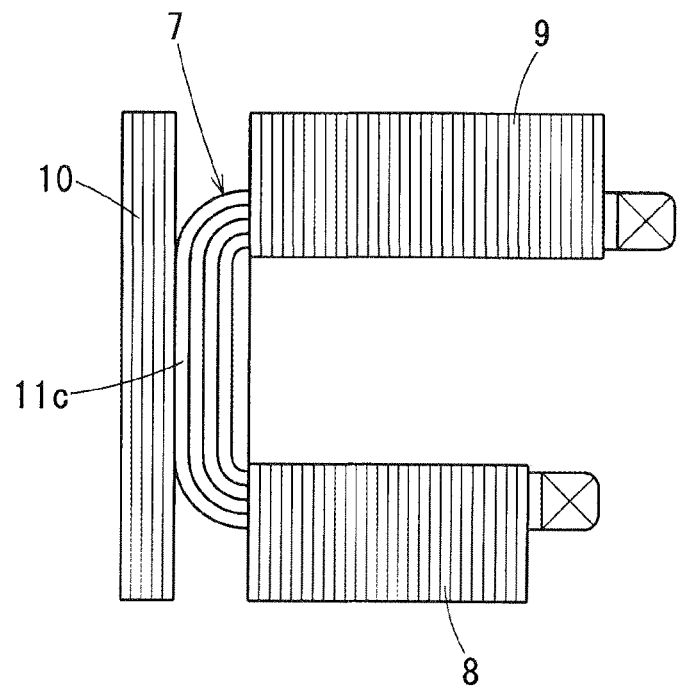
FIG. 7 is a schematic side view illustrating the configuration of a stator core according to a second embodiment.

In comparison, in the present embodiment, as shown in FIG. 7, the side core part 10 of the stator core has no slots formed therein. Instead, the stator core part 10 is arranged on the one axial side (i.e., the left side in FIG. 7) of the rotor 6 so as to abut the connecting portions 11c of the electric conductor segments 11 that have their respective first and second leg portions 11a and 11b inserted in the corresponding slots 8s and 9s of the inner and outer core parts 8 and 9 of the stator core.

With the above side core part 10 according to the present embodiment, it is also possible to configure each of the slots 8s and 9s of the inner and outer core parts 8 and 9 as a semi-closed slot, as in the first embodiment. Consequently, it is possible to effectively suppress torque ripple of the rotating electric machine with the numbers of the slots 8s and 9s set to suitable values.

Moreover, though having no slots formed therein, the side core part 10 still forms an axial magnetic gap between it and the rotor 6. Thus, as in the first embodiment, the stator core and the rotor 6 face each other through the radially inner magnetic gap, the radially outer magnetic gap and the axial magnetic gap. As a result, compared to the case of the stator core having no side core part 10, it is possible to increase the amount of magnetic flux transferred between the stator and the rotor 6, thereby increasing the output torque of the rotating electric machine.

Third Embodiment

This embodiment illustrates a multi-gap rotating electric machine which has a similar configuration to the multi-gap rotating electric machine according to the first embodiment; accordingly, only the differences therebetween will be described hereinafter.

In the first embodiment, the stator coil 7 is comprised of the three phase coils that are star-connected to each other. In other words, the stator coil 7 includes only the single set of three phase coils.

Figure 8:
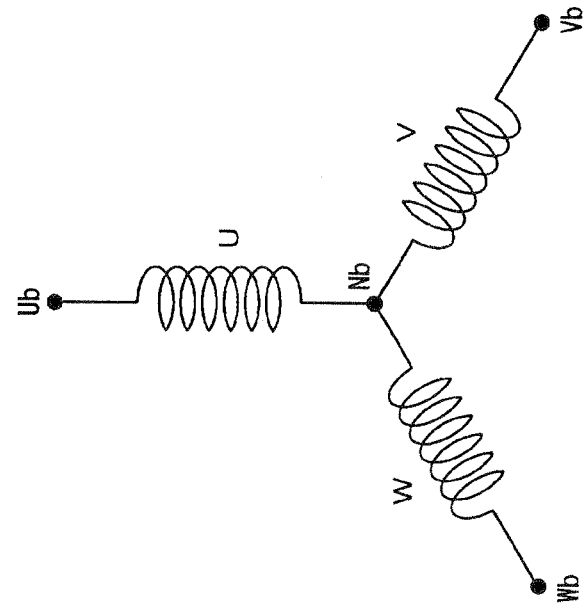
FIG. 8 is a schematic connection diagram illustrating the configuration of a stator coil according to a third embodiment.
Figure 8:
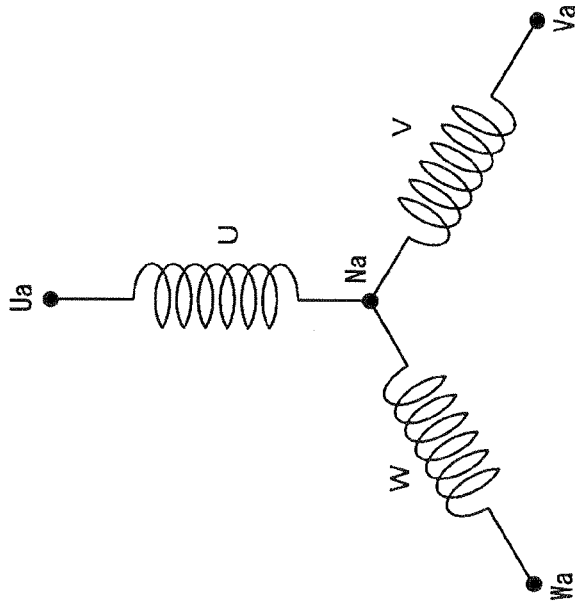

In comparison, in the present embodiment, as shown in FIG. 8, the stator coil 7 is comprised of a first set of U-phase, V-phase and W-phase coils (to be referred to as a first coil unit 7A of the stator coil 7 hereinafter) and a second set of U-phase, V-phase and W-phase coils (to be referred to as a second coil unit 7B of the stator coil 7 hereinafter).

The U-phase, V-phase and W-phase coils of the first coil unit 7A of the stator coil 7 are star-connected to each other. The U-phase, V-phase and W-phase coils of the second coil unit 7B of the stator coil 7 are also star-connected to each other. Further, the first and second coil units 7A and 7B of the stator coil 7 are connected in parallel with each other.

In the present embodiment, it is preferable, as in the first embodiment, that: the number of the magnetic poles of the rotor 6 be equal to 16: the number of the slots formed in each of the inner, outer and side core parts 8, 9 and 10 of the stator core per magnetic pole of the rotor 6 be equal to 6 (i.e., the total number of the slots formed in each of the inner, outer and side core parts 8, 9 and 10 be equal to 96); the first leg portions 11a of the electric conductor segments 11 be arranged in four layers in each of the slots 8s of the inner core part 8; the second leg portions 11b of the electric conductor segments 11 be arranged in four layers in each of the slots 9s of the outer core part 9. However, for the sake of simplicity and convenience of explanation, hereinafter, it is assumed that: the number of the magnetic poles of the rotor 6 be equal to 4: the number of the slots formed in each of the inner, outer and side core parts 8, 9 and 10 of the stator core per magnetic pole of the rotor 6 be equal to 3 (i.e., the total number of the slots formed in each of the inner, outer and side core parts 8, 9 and 10 be equal to 12); the first leg portions 11a of the electric conductor segments 11 be arranged in two layers in each of the slots 8s of the inner core part 8; the second leg portions 11b of the electric conductor segments 11 be arranged in two layers in each of the slots 9s of the outer core part 9.

Figure 9:
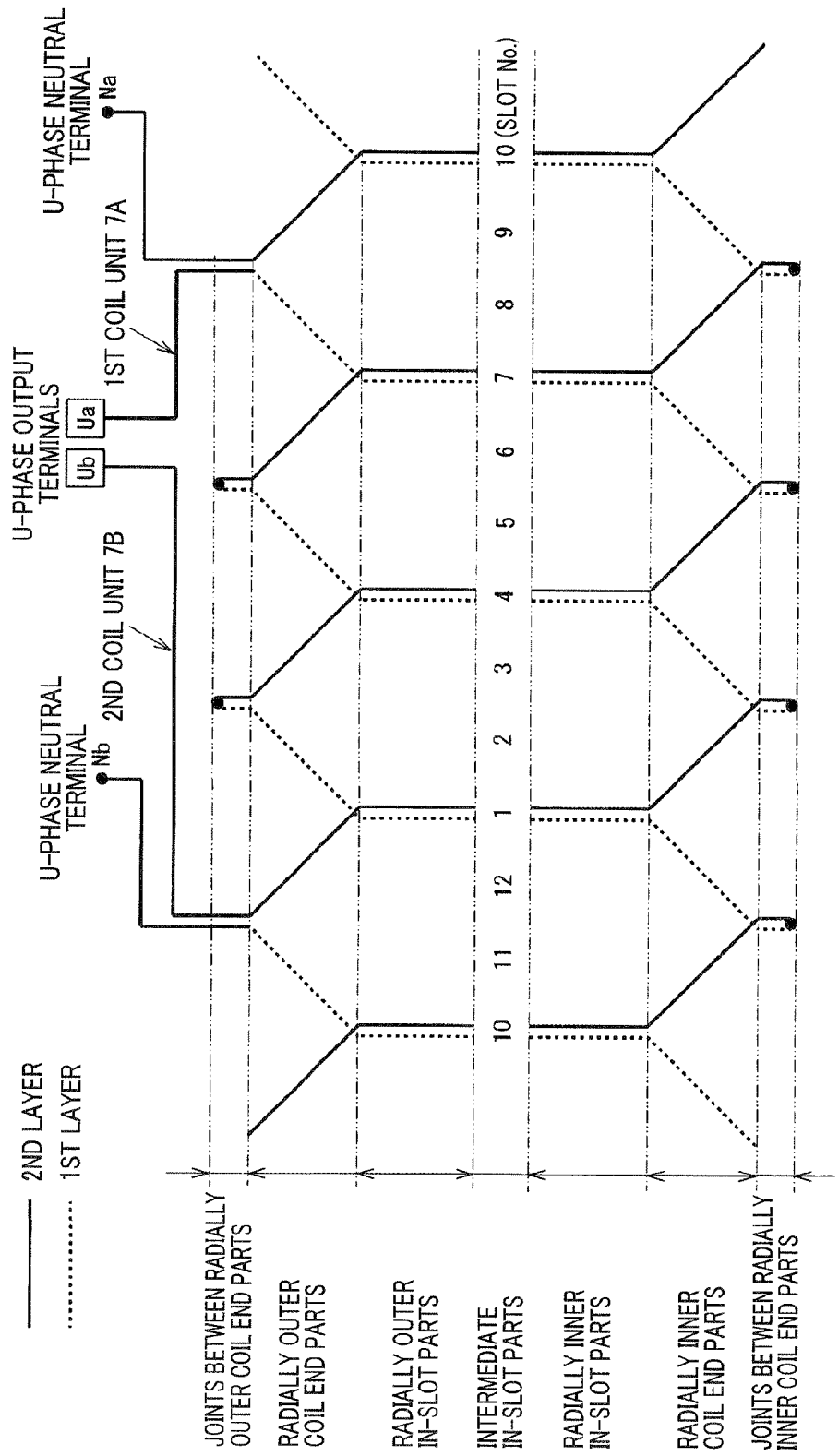
FIG. 9 is a schematic connection diagram illustrating both the configurations of U-phase coils of first and second coil units of the stator coil according to the third embodiment.
Figure 10:
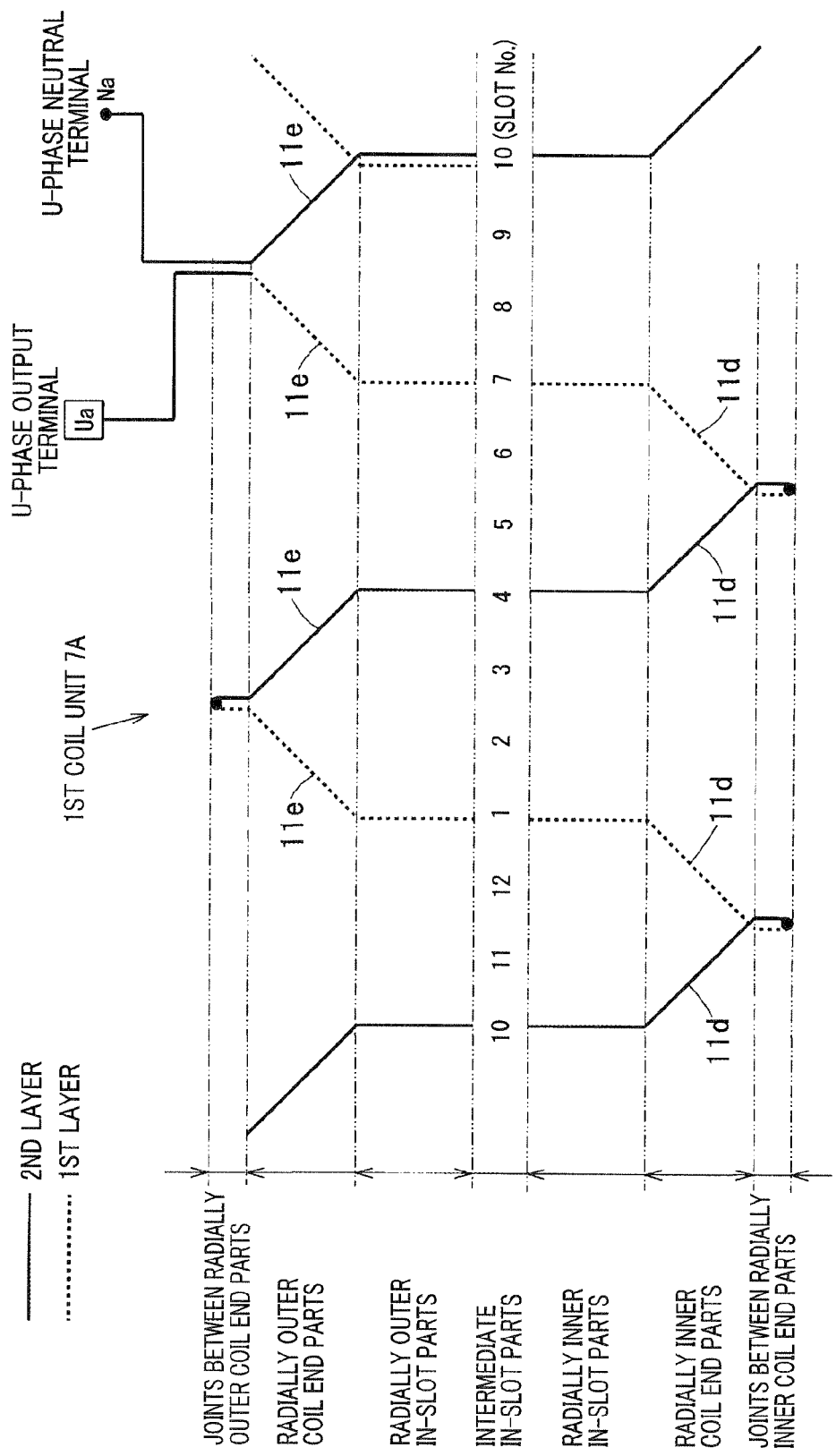
FIG. 10 is a schematic connection diagram illustrating only the configuration of the U-phase coil of the first coil unit of the stator coil according to the third embodiment.
Figure 11:
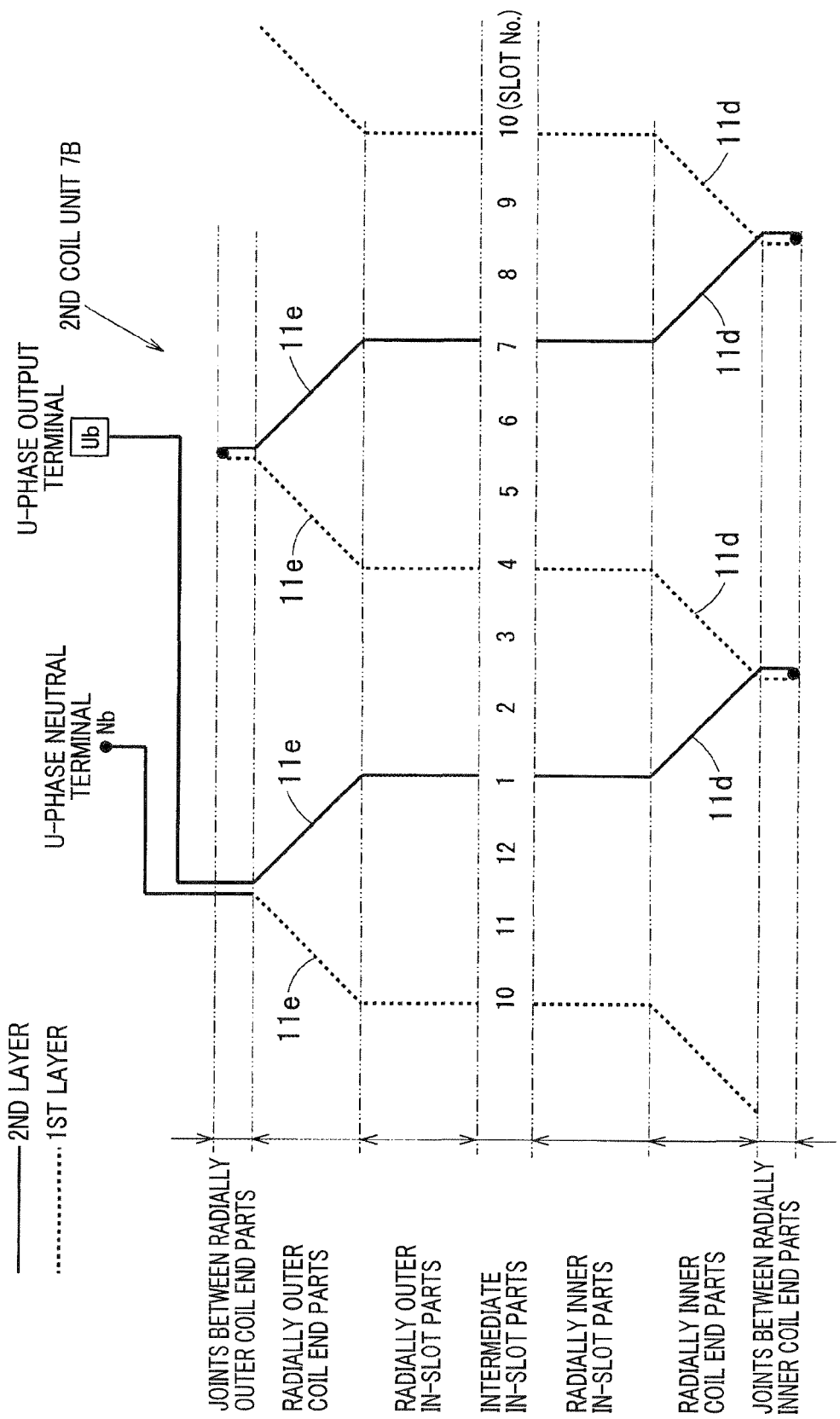
FIG. 11 is a schematic connection diagram illustrating only the configuration of the U-phase coil of the second coil unit of the stator coil according to the third embodiment.

FIG. 9 illustrates the arrangements of the first and second coil units 7A and 7B of the stator coil 7 on the stator core by taking the U-phase coils of the first and second coil units 7A and 7B as an example. FIG. 10 illustrates the arrangement of the U-phase coil of the first coil unit 7A on the stator core. FIG. 11 illustrates the arrangement of the U-phase coil of the second coil unit 7B on the stator core. In addition, in each of FIGS. 9-11, the front side of the paper surface coincides with the opening side of the slots 8s, 9s and 10s of the inner, outer and side core parts 8, 9 and 10 of the stator core.

Hereinafter, for the sake of convenience of explanation, in each of the slots 8s and 9s of the inner and outer core parts 8 and 9 of the stator core, the opening-side layer (or the rotor-side layer) will be referred to as the first layer, while the bottom-side layer (or the non-rotor-side layer) will be referred to as the second layer. In addition, in FIGS. 9-11, the first layer is indicated with a dashed line, while the second layer is indicated with a solid line.

Moreover, in FIGS. 9-11, U-phase output terminals of the first and second coil units 7A and 7B of the stator coil 7 are respectively denoted by Ua and Ub, while U-phase neutral terminals of the first and second coil units 7A and 7B are respectively denoted by Na and Nb. In addition, the slot numbers in the range of 1-12 are also shown at a central portion in each of FIGS. 9-11.

Furthermore, in FIGS. 9-11, different parts of the U-phase coils of the first and second coil units 7A and 7B of the stator coil 7 are designated from the radially outside to the radially inside of the stator core by: joints between radially outer coil end parts; the radially outer coil end parts; radially outer in-slot parts; intermediate in-slot parts; radially inner in-slot parts; radially inner coil end parts; and joints between the radially inner coil end parts.

In addition, each of the radially outer coil end parts of the U-phase coils of the first and second coil units 7A and 7B is made up of one of the radially outer coil end parts 11e of the electric conductor segments 11 forming the U-phase coils; each of the radially outer in-slot parts of the U-phase coils is made up of one of the second leg portions 11b of the electric conductor segments 11 inserted in the corresponding slots 9s of the outer core part 9 of the stator core; each of the intermediate in-slot parts of the U-phase coils is made up of one of the connecting portions 11c of the electric conductor segments 11 inserted in the corresponding slots 10s of the side core part 10 of the stator core; each of the radially inner in-slot parts of the U-phase coils is made up of one of the first leg portions 11a of the electric conductor segments 11 inserted in the slots 8s of the inner core part 8 of the stator core; each of the radially inner coil end parts of the U-phase coils is made up of one of the radially inner coil end parts 11d of the electric conductor segments 11.

As shown in FIG. 10, the U-phase coil of the first coil unit 7A is formed by connecting four of the electric conductor segments 11 into a wave shape. Among the four electric conductor segments 11, the first electric conductor segment 11 is inserted in the first layers of the No. 7 slots 8s, 9s and 10s of the inner, outer and side core parts 8, 9 and 10 of the stator core; the second electric conductor segment 11 is inserted in the second layers of the No. 4 slots 8s, 9s and 10s; the third electric conductor segment 11 is inserted in the first layers of the No. 1 slots 8s, 9s and 10s; and the fourth electric conductor segment 11 is inserted in the second layers of the No. 10 slots 8s, 9s and 10s. Further, the radially outer coil end part 11e of the first electric conductor segment 11 is joined to or formed integrally with the U-phase output terminal Ua of the first coil unit 7A. The radially inner coil end part 11d of the first electric conductor segment 11 is joined to the radially inner coil end part 11d of the second electric conductor segment 11. The radially outer coil end part 11e of the second electric conductor segment 11 is joined to the radially outer coil end part 11e of the third electric conductor segment 11. The radially inner coil end part 11d of the third electric conductor segment 11 is joined to the radially inner coil end part 11d of the fourth electric conductor segment 11. The radially outer coil end part 11e of the fourth electric conductor segment 11 is joined to or formed integrally with the U-phase neutral terminal Na of the first coil unit 7A.

On the other hand, as shown in FIG. 11, the U-phase coil of the second coil unit 7B is formed by connecting another four of the electric conductor segments 11 into a wave shape. Among the another four electric conductor segments 11, the first electric conductor segment 11 is inserted in the second layers of the No. 1 slots 8s, 9s and 10s of the inner, outer and side core parts 8, 9 and 10 of the stator core; the second electric conductor segment 11 is inserted in the first layers of the No. 4 slots 8s, 9s and 10s; the third electric conductor segment 11 is inserted in the second layers of the No. 7 slots 8s, 9s and 10s; and the fourth electric conductor segment 11 is inserted in the first layers of the No. 10 slots 8s, 9s and 10*s*. Further, the radially outer coil end part 11*e* of the first electric conductor segment 11 is joined to or formed integrally with the U-phase output terminal Ub of the second coil unit 7B. The radially inner coil end part 11*d* of the first electric conductor segment 11 is joined to the radially inner coil end part 11*d* of the second electric conductor segment 11. The radially outer coil end part 11*e* of the second electric conductor segment 11 is joined to the radially outer coil end part 11*e* of the third electric conductor segment 11. The radially inner coil end part 11*d* of the third electric conductor segment 11 is joined to the radially inner coil end part 11*d* of the fourth electric conductor segment 11. The radially outer coil end part 11*e* of the fourth electric conductor segment 11 is joined to or formed integrally with the U-phase neutral terminal Nb of the second coil unit 7B.

Consequently, the radially inner, radially outer and intermediate in-slot parts of the U-phase coil of the first coil unit 7A are arranged alternately with those of the U-phase coil of the second coil unit 7B at the first and second layers in the corresponding slots 8*s*, 9*s* and 10*s* of the inner, outer and side core parts 8, 9 and 10 of the stator core. In other words, for each of the U-phase coils of the first and second coil units 7A and 7B, the radially inner, radially outer and intermediate in-slot parts of the U-phase coil are arranged in the corresponding slots 8*s*, 9*s* and 10*s* of the inner, outer and side core parts 8, 9 and 10 in a radially shifted manner. In addition, the above arrangement is made possible by forming the joints between the electric conductor segments 11 at both the inner and outer core parts 8 and 9 of the stator core.

Moreover, as shown in FIG. 10, the U-phase coil of the first coil unit 7A extends from the U-phase output terminal Ua to the U-phase neutral terminal Na via the No. 7 slots 8*s*-10*s*, the No. 4 slots 8*s*-10*s*, the No. 1 slots 8*s*-10 and the No. 10 slots 8*s*-10*s*. In other words, the winding path of the U-phase coil of the first coil unit 7A advances from the right side to the left side in FIG. 10 (i.e., in the counterclockwise direction when viewed from the rotor 6 side). On the other hand, as shown in FIG. 11, the U-phase coil of the second coil unit 7B extends from the U-phase output terminal Ub to the U-phase neutral terminal Nb via the No. 1 slots 8*s*-10*s*, the No. 4 slots 8*s*-10*s*, the No. 7 slots 8*s*-10 and the No. 10 slots 8*s*-10*s*. In other words, the winding path of the U-phase coil of the second coil unit 7B advances from the left side to the right side in FIG. 11 (i.e., in the clockwise direction when viewed from the rotor 6 side).

That is, in the present embodiment, the U-phase coils of the first and second coil units 7A and 7B extend respectively in opposite circumferential directions and in a wavelike fashion symmetrically relative to each other. Moreover, the total number of the radially inner, radially outer and intermediate in-slot parts of the U-phase coil of the first coil unit 7A is equal to that of the U-phase coil of the second coil unit 7B. Further, as described previously, the radially inner, radially outer and intermediate in-slot parts of the U-phase coil of the first coil unit 7A are arranged alternately with those of the U-phase coil of the second coil unit 7B at the first and second layers in the corresponding slots 8*s*, 9*s* and 10*s* of the inner, outer and side core parts 8, 9 and 10 of the stator core. Consequently, it becomes possible to make the lengths of the U-phase coils of the first and second coil units 7A and 7B equal to each other, thereby making the differences in electric resistance and inductance between the two U-phase coils zero.

In addition, the V-phase and W-phase coils of the first and second coil units 7A and 7B are arranged in the same manner as the U-phase coils described above. Consequently, it is possible to make the lengths of the V-phase coils of the first and second coil units 7A and 7B equal to each other, thereby making the differences in electric resistance and inductance between the two V-phase coils zero; it is also possible to make the lengths of the W-phase coils of the first and second coil units 7A and 7B equal to each other, thereby making the differences in electric resistance and inductance between the two W-phase coils zero.

Accordingly, it is possible to make the differences in electromagnetic characteristics between the first and second coil units 7A and 7B zero. As a result, even if there is a magnetic gap imbalance between the stator core and the rotor 6 due to a manufacturing error, it is still possible to prevent circulating current from flowing in the parallel circuit formed of the first and second coil units 7A and 7B, thereby ensuring high efficiency of the rotating electric machine.

Moreover, compared to the case of configuring the stator coil 7 to include only one set of U-phase, V-phase and W-phase coils and instead doubling the cross-sectional area of each of the electric conductor segments 11, it is possible to improve the workability (or processability) of the electric conductor segments 11 and reduce the size of the coil end parts of the electric conductor segments 11.

In addition, as stated previously, the above explanation is made on the assumption that the electric conductor segments 11 are arranged in two layers in each of the slots 8*s*, 9*s* and 10*s* of the inner, outer and side core parts 8, 9 and 10 of the stator core. However, in the case that the electric conductor segments 11 are arranged in four layers in each of the slots 8*s*, 9*s* and 10*s* of the inner, outer and side core parts 8, 9 and 10, it is still possible to achieve the above-described advantageous effects by arranging the radially inner, radially outer and intermediate in-slot parts of the U-phase coil of the first coil unit 7A alternately with those of the U-phase coil of the second coil unit 7B at the first and second layers and at the second and fourth layers in the corresponding slots 8*s*, 9*s* and 10*s* of the inner, outer and side core parts 8, 9 and 10.

While the above particular embodiments have been shown and described, it will be understood by those skilled in the art that various modifications, changes, and improvements may be made without departing from the spirit of the present invention.

For example, in the first embodiment, each of the slots 8*s* and 9*s* of the inner and outer core parts 8 and 9 of the stator core is formed as a semi-closed slot. That is, each of the slots 8*s* is partially closed at the radially outer periphery of the inner core part 8, and each of the slots 9*s* is partially closed at the radially inner periphery of the outer core part 9.

However, each of the slots 8*s* and 9*s* of the inner and outer core parts 8 and 9 of the stator core may be formed as a fully-closed slot. That is, each of the slots 8*s* may be formed so as to be fully closed at the radially outer periphery of the inner core part 8, and each of the slots 9*s* may be formed so as to be fully closed at the radially inner periphery of the outer core part 9.

In the first and second embodiments, the stator core includes the side core part 10 in addition to the inner and outer core parts 8 and 9.

However, the side core part 10 may be omitted from the stator core. Moreover, the stator core may include, instead of the side core part 10, a connecting member that mechanically connects, on the one axial side of the rotor 6, the inner and outer core parts 8 and 9 of the stator core so as to be coaxial with the rotor 6. The connecting member may be made of a nonmagnetic material, such as stainless steel. Further, the connecting member may have formed therein a plurality of grooves which correspond to the slots 10*s* of the side core part 10. That is, each of the grooves may be formed in the connecting member so as to communicate with one corresponding pair of the slots 8s and 9s of the inner and outer core parts 8 and 9 of the stator core.

What is claimed is:

1. A multi-gap rotating electric machine comprising:
an annular rotor connected to a rotating shaft;
a stator core having, at least, an inner core part, a side core part, an outer core part and core teeth, the inner core part having an annular shape and being located radially inside of the rotor with a radially inner magnetic gap formed between the inner core part and the rotor, the inner core part having a plurality of inner core slots formed at a constant pitch in a circumferential direction of the inner core part, the outer core part having an annular shape and being located radially outside of the rotor with a radially outer magnetic gap formed between the outer core part and the rotor, the outer core part having a plurality of outer core slots formed at a constant pitch in a circumferential direction of the outer core part, the side core part having a plurality of side core slots, each of the inner core slots, outer core slots and side core slots having an equal slot width that is greater than a slot width between the core teeth; and
a multi-phase stator coil including a plurality of phase coils, each of the phase coils being formed of a plurality of electric conductor segments mounted on the stator core,
wherein
each of the inner core slots is formed so as to be at least partially closed at a radially outer periphery of the inner core part,
each of the outer core slots is formed so as to be at least partially closed at a radially inner periphery of the outer core part,
each of the electric conductor segments forming the phase coils of the stator coil is substantially U-shaped to have a first leg portion inserted in a corresponding one of the inner slots, a second leg portion inserted in a corresponding one of the outer core slots, and a connecting portion that connects the first and second leg portions on one axial side of the rotor,
the first leg portion has a distal end part that protrudes from the corresponding inner core slot on the opposite axial side to the connecting portion of the electric conductor segment,
the distal end part of the first leg portions is bent to extend along the circumferential direction of the inner core part and thereby forms a radially inner coil end part of the electric conductor segment,
the second leg portion has a distal end part that protrudes from the corresponding outer core slot on the opposite axial side to the connecting portion of the electric conductor segment,
the distal end part of the second leg portion is bent to extend along the circumferential direction of the outer core part and thereby forms a radially outer coil end part of the electric conductor segment,
each corresponding pair of the radially inner coil end parts of the electric conductor segments are bound to each other at a first respective joint,
each corresponding pair of the radially outer coil end parts of the electric conductor segments are bound to each other at a second respective joint.

2. The multi-gap rotating electric machine as set forth in claim 1, wherein for each of the substantially U-shaped electric conductor segments, the distal end part of the first leg portion of the electric conductor segment is bent toward one circumferential side to form the radially inner coil end part, and the distal end part of the second leg portion of the electric conductor segment is bent toward the other circumferential side to form the radially outer coil end part.

3. The multi-gap rotating electric machine as set forth in claim 1, wherein the side core part is located on the one axial side of the rotor with an axial magnetic gap formed between the side core part and the rotor.

4. The multi-gap rotating electric machine as set forth in claim 3, wherein the side core part of the stator core is mechanically connected with both the inner and outer core parts of the stator core,
the side core slots each axially penetrates the side core part and radially extends to communicate with one corresponding pair of the inner core slots and the outer core slots, and
at least part of the substantially U-shaped electric conductor segments have their respective connecting portions received in corresponding ones of the side core slots.

5. The multi-gap rotating electric machine as set forth in claim 1, wherein the stator coil is comprised of first and second coil units each of which consists of a plurality of phase coils, the first and second coil units being connected in parallel with each other,
each of the phase coils of the first and second coil units is formed by connecting a predetermined number of the substantially U-shaped electric conductor segments,
for each of the phase coils of the first and second coil units, the first leg portions of the electric conductor segments forming the phase coil are arranged in the corresponding inner core slots in a radially shifted manner, the corresponding inner core slots being circumferentially apart from one another by a predetermined number of the inner core slots, and
the second leg portions of the electric conductor segments forming the phase coil are arranged in the corresponding outer core slots in a radially shifted manner, the corresponding outer core slots being circumferentially apart from one another by a predetermined number of the outer core slots.

* * * * *